(12) United States Patent
Collins et al.

(10) Patent No.: US 6,226,165 B1
(45) Date of Patent: May 1, 2001

(54) SYSTEM AND METHOD FOR SECURING A COMPUTER SYSTEM

(75) Inventors: Michael Thad Collins, Round Rock; Damon William Broder, Austin, both of TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 09/291,540

(22) Filed: Apr. 14, 1999

(51) Int. Cl.[7] .................................................. H01H 73/00
(52) U.S. Cl. ................................. 361/115; 361/1; 361/45
(58) Field of Search ................................... 361/115, 1–45

(56) References Cited

U.S. PATENT DOCUMENTS

| | | | |
|---|---|---|---|
| 3,595,228 | 7/1971 | Simon et al. | 128/145.5 |
| 3,706,090 | 12/1972 | Callaghan | 340/274 |
| 3,952,295 | 4/1976 | Luisada et al. | 340/273 |
| 4,023,073 | 5/1977 | Georgi | 361/45 |
| 4,158,197 | 6/1979 | Takagaki | 340/574 |
| 4,228,425 | 10/1980 | Cooke | 340/550 |
| 4,459,582 | 7/1984 | Sheahan et al. | 340/539 |
| 4,859,865 | * 8/1989 | Vandenburgh | 250/253 |
| 5,638,944 | 6/1997 | Diebel et al. | 200/43.1 |
| 5,838,225 | * 11/1998 | Todd | 340/571 |

* cited by examiner

*Primary Examiner*—Stephen W. Jackson
(74) *Attorney, Agent, or Firm*—Haynes and Boone, L.L.P.

(57) ABSTRACT

A housing for components of a computer system includes a portion having a material which is integral with an electrically conductive signal line. The material and the electrically conductive signal line are formed so as to physically break in response to application of a physical force on the material. Circuitry is coupled to the signal line for detecting a physical break in the material by detecting an open circuit caused by physically breaking the electrically conductive signal line. In response to the open circuit, an operation of the computer system is disabled.

28 Claims, 5 Drawing Sheets

SYSTEM AND METHOD FOR SECURING A COMPUTER SYSTEM

BACKGROUND

The disclosures herein relate in general to computer systems and in particular to an information processing system and method for securing operation of a computer system.

In comparison to a desktop computer, a portable computer is more subject to theft under some circumstances. Accordingly, various security features have been developed to deter such theft. At least some of those features are mechanical. According to one technique, a mechanical security device (e.g. a hook latch protrusion) mechanically secures (e.g. holds) the portable computer to a docking station. Nevertheless, such a technique has at least one shortcoming. For example, the mechanical security device is subject to defeat by mechanically prying the portable computer loose from the docking station. With such a technique, the portable computer's security is dependent on increased strength of a material, such as plastic or metal, that houses components of the portable computer or docking station. Nevertheless, practical limits (on the extent to which the material's strength may be increased) are imposed by factors such as cost and weight.

Accordingly, a need has arisen for a system and method for securing a computer system, in which various shortcomings of previous techniques are overcome. More particularly, a need has arisen for a system and method for securing a computer system, in which the computer system's security is less dependent on increased strength of material that houses components of the computer system.

SUMMARY

One embodiment, accordingly, provides for a housing for components of a computer system. A portion of the housing includes a material which includes circuitry for detecting a physical break in the material. In response to the physical break, the circuitry disables an operation of the computer system.

A principal advantage of this embodiment is that (a) various shortcomings of previous techniques are overcome, and (b) the computer system's security is less dependent on increased strength of material that houses components of the computer system.

DETAILED DESCRIPTION

Figure 1:
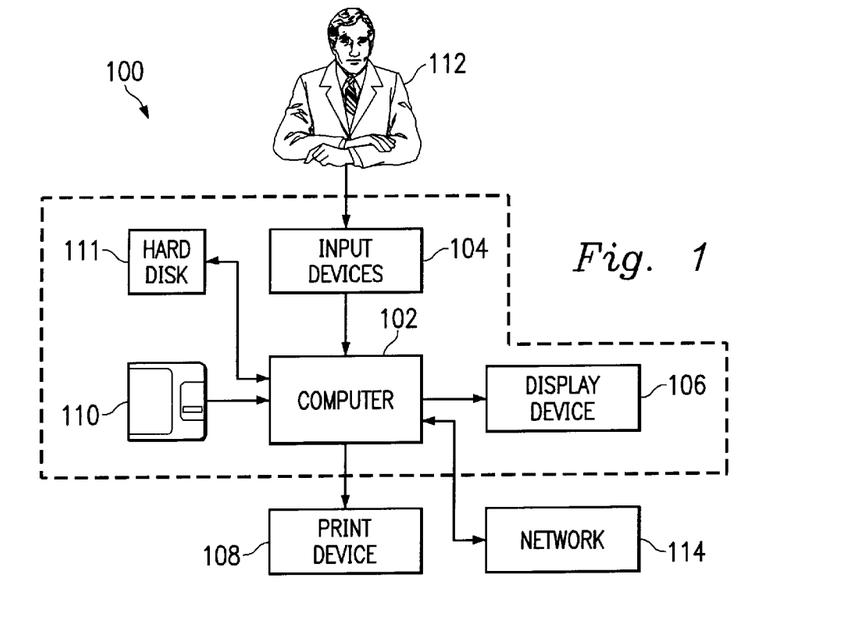
FIG. 1 is a block diagram of a computer system according to the illustrative embodiment.

FIG. 1 is a block diagram of a computer system, indicated generally at 100, according to the illustrative embodiment. System 100 includes input devices 104, a display device 106, and a computer 102 for executing processes and performing operations (e.g. communicating information) in response thereto as discussed further hereinbelow. In the illustrative embodiment, system 100 is an IBM-compatible portable personal computer ("PC") that executes Microsoft Windows 95 operating system ("OS") software. All Microsoft products identified herein are available from Microsoft Corporation, One Microsoft Way, Redmond, Wash. 98052-6399, telephone (425) 882-8080.

Computer 102 is connected to input devices 104, display device 106 and a print device 108. Print device 108 is, for example, a conventional electronic printer or plotter. Also, computer 102 includes internal speakers for outputting audio signals. In an alternative embodiment, the speakers are external to computer 102. Moreover, system 100 includes (a) a first computer-readable medium (or apparatus) 110 which is a floppy diskette and (b) a second computer-readable medium (or apparatus) 111 which is a computer hard disk.

A human user 112 and computer 102 operate in association with one another. For example, in response to signals from computer 102, display device 106 displays visual images, and user 112 views such visual images. Also, in response to signals from computer 102, print device 108 prints visual images on paper, and user 112 views such visual images. Further, user 112 operates input devices 104 in order to output information to computer 102, and computer 102 receives such information from input devices 104.

Input devices 104 include, for example, a conventional electronic keyboard and a pointing device such as a conventional electronic "mouse", rollerball or light pen. User 112 operates the keyboard to output alphanumeric text information to computer 102, and computer 102 receives such alphanumeric text information from the keyboard. User 112 operates the pointing device to output cursor-control information to computer 102, and computer 102 receives such cursor-control information from the pointing device.

A network 114 includes a network local area network ("LAN") control manager server computer ("LCM"). For communicating with (i.e. outputting information to, and receiving information from) network 114 (including the LCM), computer 102 includes a network interface card ("NIC") which is yet another type of computer-readable medium (or apparatus) connected to computer 102.

Figure 2:
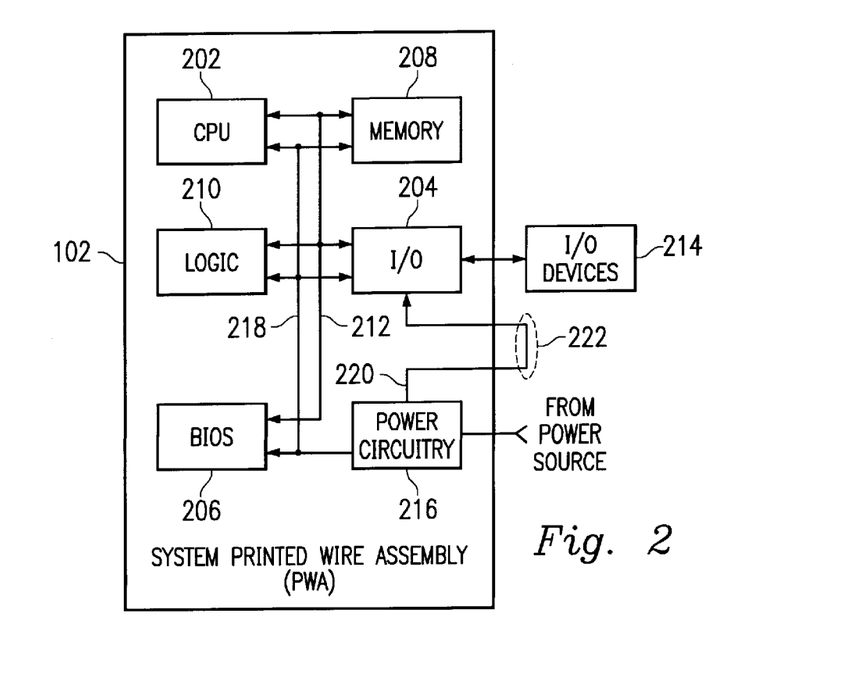
FIG. 2 is a block diagram of a computer of the computer system of FIG. 1.

FIG. 2 is a block diagram of computer 102, which is formed by various electronic circuitry components. In the example of FIG. 2, such electronic circuitry components reside on a system printed wire assembly ("PWA"). As shown in FIG. 2, the electronic circuitry components of computer 102 include: a central processing unit ("CPU") 202 for executing and otherwise processing instructions, input/output ("I/O") controller circuitry 204, a basic input/output system ("BIOS") electrically erasable programmable read only memory device ("EEPROM") 206 for storing firmware, a memory 208 such as random access memory device ("RAM") and read only memory device ("ROM") for storing information (e.g. instructions executed by CPU 202 and data operated upon by CPU 202 in response to such instructions), and other miscellaneous electronic circuitry logic 210 for performing other operations of computer 102, all coupled to one another through one or more buses 212. Also, computer 102 may include various other electronic circuitry components that, for clarity, are not shown in FIG. 2.

As shown in FIG. 2, I/O controller circuitry 210 is coupled to I/O devices 216. I/O devices 216 include, for example, input devices 104, display device 106, print device 108, floppy diskette 110, hard disk 111, and the network interface card ("NIC") discussed hereinabove in connection with FIG. 1. I/O controller circuitry 210 includes controller circuitry for operating I/O devices 216, reading information from I/O devices 216, and writing information to I/O devices 216.

Computer 102 operates its various components (e.g. I/O controller circuitry 210) in response to information stored by BIOS 206. For example, I/O controller circuitry 210 outputs various interrupt requests ("IRQs"), and computer 102 reacts to such IRQs in response to information stored by BIOS 206. Accordingly, by suitably modifying information stored by BIOS 206, one or more components of computer 102 may be effectively disabled, so that computer 102 operates without reference to such components. In such a situation where a component is disabled, computer 102 would not react to an IRQ from such a disabled component, and computer 102 would not allocate resources to such a disabled component.

Also, computer 102 includes power circuitry 216 coupled through a power bus 218 to each of CPU 202, I/O controller circuitry 204, BIOS 206, memory 208 and logic 210. Power circuitry 216 receives power from a power source, converts such power into a suitable form, and distributes such converted power through power bus 218. Accordingly, power circuitry 216 includes circuitry such as pull-up resistors.

In a significant aspect of the illustrative embodiment, power circuitry 216 is further connected to I/O controller circuitry 204 through an electrically conductive signal line 220, such as a semiconductor device, a small printed circuit board ("PCB"), a metal wire, or other electrically conductive device or material. Preferably, line 220 is substantially difficult for a human thief to repair after line 220 physically breaks. As shown in FIG. 2, a portion of line 220 extends away from the PWA. Such portion is identified by dashed enclosure 222.

In the illustrative embodiment, the programming of BIOS 206 and the design of I/O controller circuitry 204 are suitable to: (a) enable booting and normal operation of computer 102, so long as line 220 remains intact to form a closed circuit between power circuitry 216 and I/O controller circuitry 204; and (b) disable booting and normal operation of computer 102 if line 220 (e.g. portion 222) is broken to form an open circuit between power circuitry 216 and I/O controller circuitry 204. In that manner, electronic circuitry components (e.g. BIOS 206 and I/O controller circuitry 204) of computer 102 detect a physical break in line 220 and, in response to the physical break, disable an operation of system 100.

Figure 3:
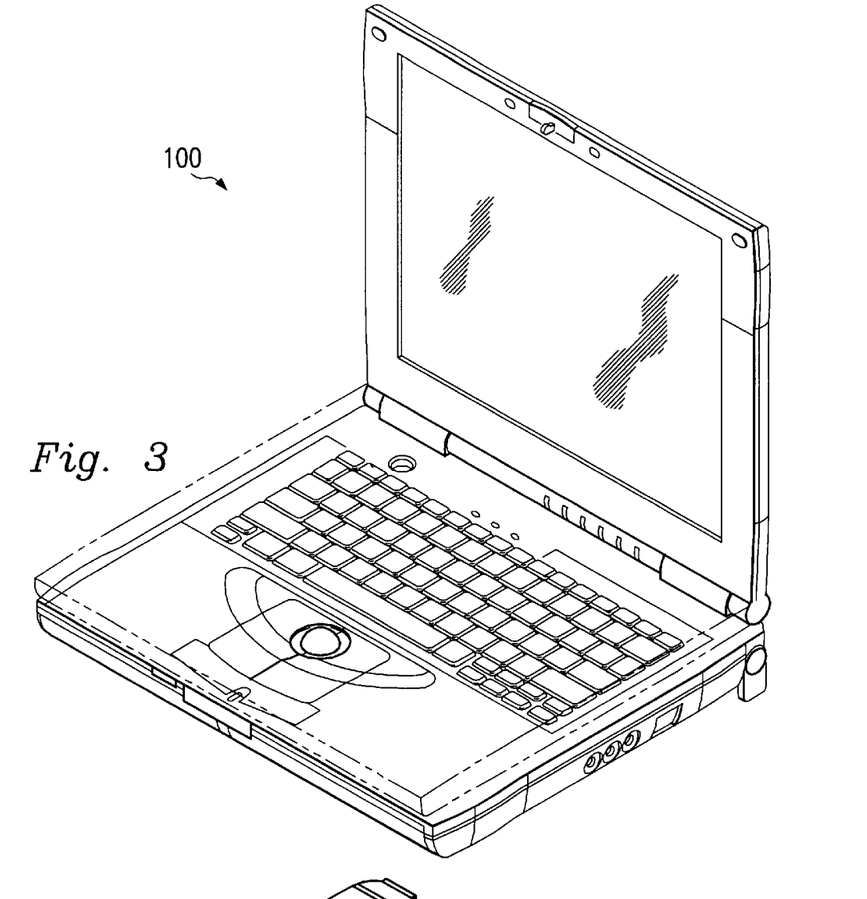
FIG. 3 is a first perspective view of a portable embodiment of the computer system of FIG. 1.
Figure 4:
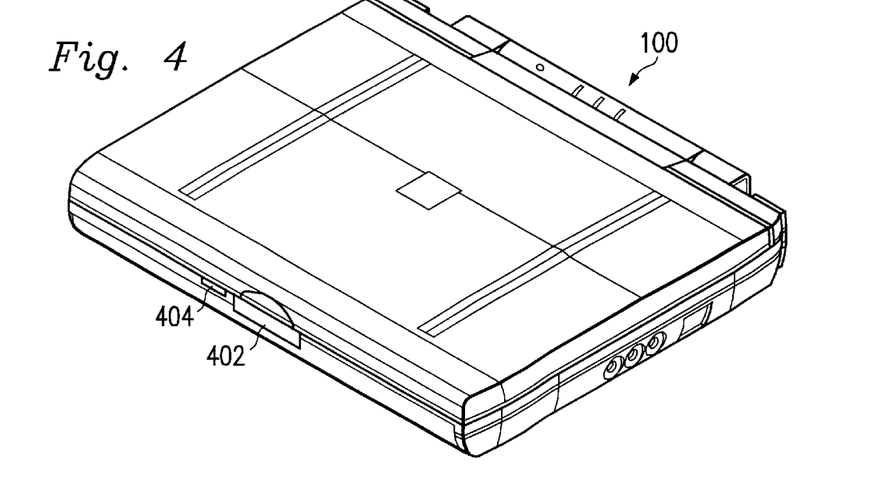
FIG. 4 is a second perspective view of the portable embodiment of FIG. 3.

FIG. 3 is a first perspective view of a portable embodiment of system 100. In the illustrative embodiment, the portable embodiment of system 100 is a laptop computer or notebook computer. In an alternative embodiment, the portable embodiment of system 100 is a palmtop computer device or other handheld computer system. FIG. 4 is a second perspective view of the portable embodiment of system 100. As shown in FIG. 4, a rear portion of the portable embodiment includes receptacles 402 and 404.

Figure 5:
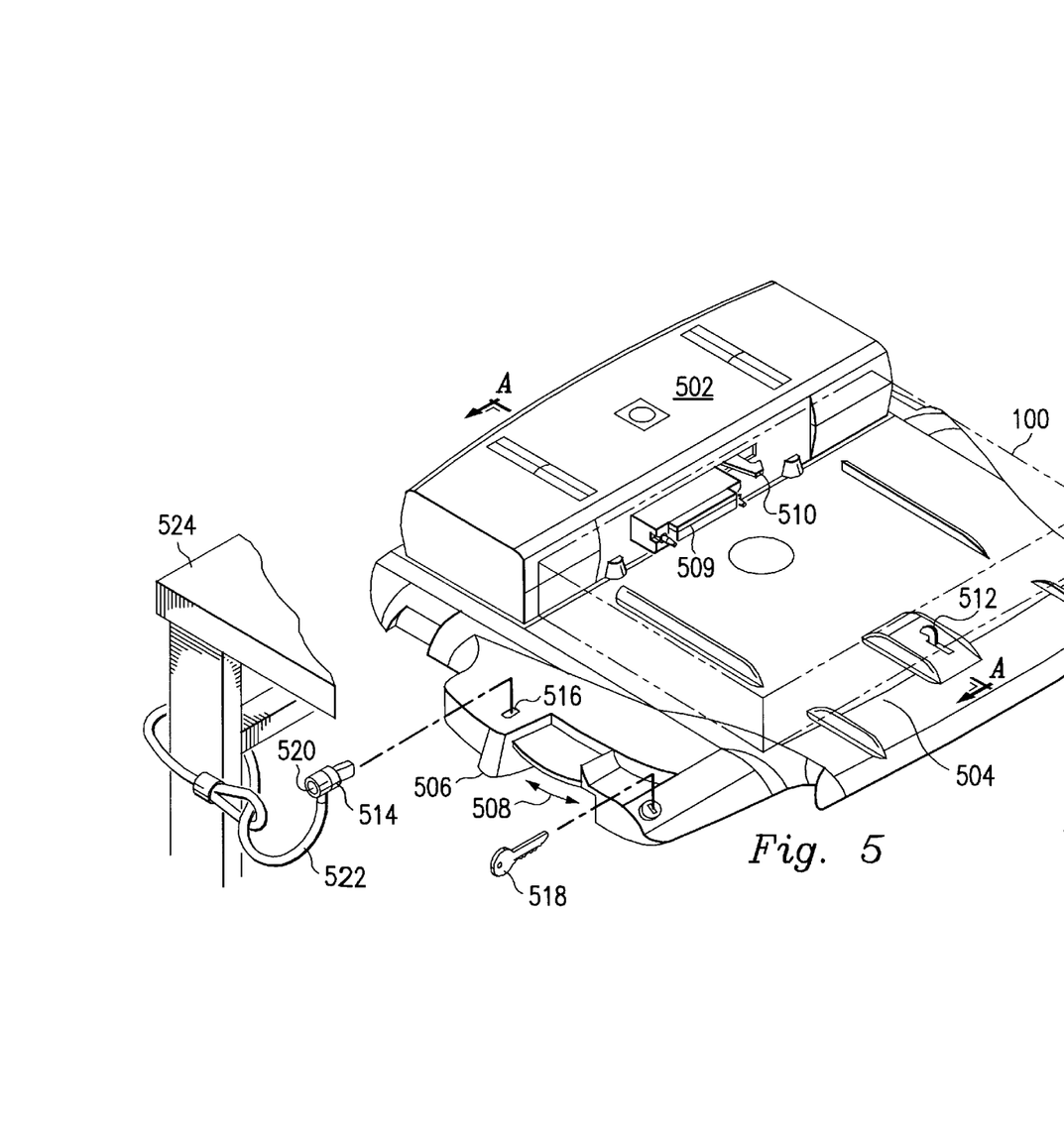
FIG. 5 is a perspective view of a docking station as it secures the portable embodiment of FIG. 3.

FIG. 5 is a perspective view of a docking station 502 device as it secures the portable embodiment of system 100. Docking station 502 includes a surface 504 for supporting the portable embodiment of system 100, as shown in FIG. 5. A handle 506 of docking station 502 is operable by user 112 and is movable along the direction of line 508 between an eject position, an unlock position, and a lock position.

Docking station 502 includes a bus connector 509 for mechanically engaging with receptacle 402 (FIG. 4) at the rear portion of system 100, in order to electrically connect docking station 502 to system 100 and thereby enable communication of information between them. Also, docking station 502 includes a first security device 510 having a hook latch protrusion that is selectively movable into and out of mechanical engagement with receptacle 404 (FIG. 4) at the rear portion of system 100, in order to mechanically secure system 100 to docking station 502. Likewise, docking station 502 includes a second security device 512 having a hook latch protrusion that is selectively movable into and out of mechanical engagement with a bottom receptacle of system 100, in order to mechanically secure system 100 to docking station 502. In the disclosures herein, all references to engaging (or engagement of) A with B are likewise intended to mean engaging (or engagement of) B with A, so that such engaging (or engagement) is of A and B with one another (i.e. engaging (or engagement) between A and B).

The hook latch protrusions of security devices 510 and 512 are selectively movable in response to a movement of handle 506 between the eject position, the unlock position, and the lock position. In operation, system 100 is seated on docking station 502 with handle 506 in the unlock position. When system 100 is to be mechanically secured to docking station 502, user 112 operates handle 506 by moving it to the lock position. In response to such an operation, the hook latch protrusions of security devices 510 and 512 move into mechanical engagement with system 100. During such engagement between docking station 502 and system 100, physical disconnection of system 100 from docking station 502 (e.g. physical removal of system 100 away from docking station 502) involves physically breaking system 100 by application of a predetermined physical force on system 100.

When system 100 is to be removed from docking station 502, user 112 operates handle 506 by moving it to the eject position, and handle 506 subsequently returns to the unlock position. In response to such operation, the hook latch protrusions of security devices 510 and 512 move out of mechanical engagement with (i.e. mechanically disengage from) system 100, in order to mechanically release system 100 from docking station 502.

For increased security, after user 112 moves handle 506 to the lock position, user 112 may (a) insert a locking device 514 into a receptacle 516 of docking station 502, (b) insert a key 518 into a receptacle 520 of locking device 514, (c) rotate key 518 in a clockwise direction, and (d) then remove key 518 from locking device 514. In that manner, user 112 operates locking device 514 to lock docking station 502 into a substantially fixed position, so that handle 506 is substantially fixed in the lock position and ceases being movable to the eject or unlock positions (i.e. ceases being operable (by user 112) to mechanically release system 100 from docking station 502). Accordingly, locking device 514 is for disabling mechanical release of system 100 from docking station 502, so that physical disconnection of system 100 from docking station 502 (e.g. physical removal of system 100 away from docking station 502) involves physically breaking system 100 by application of a predetermined physical force on system 100. Moreover, in that manner, locking device 514 secures docking station 502 through a connector device (e.g. cable 522 in FIG. 5) which connects docking station 502 to a relatively fixed (e.g. substantially stationary or immobile) object (e.g. table 524 in FIG. 5).

Accordingly, in that situation, hook latch protrusions of security devices 510 and 512 continue mechanically engaging with system 100 and accordingly continue mechanically securing system 100 to docking station 502, at least until user 112 unlocks docking station 502. User 112 may unlock docking station 502 by (a) reinserting key 518 into locking device 514, (b) rotating key 518 in a counterclockwise direction, and (c) then removing locking device 514 from docking station 502. When user 112 unlocks docking station 502, handle 506 ceases being locked in the substantially fixed position and resumes being movable to the eject and unlock positions (i.e. resumes being operable (by user 112) to mechanically release system 100 from docking station 502). In that manner, user 112 reenables mechanical release of system 100 from docking station 502, so that physical disconnection of system 100 from docking station 502 (e.g. physical removal of system 100 away from docking station 502) ceases to involve physically breaking system 100. By suitably concealing key 518 after locking docking station 502, user 112 enhances the security of system 100 in its mechanical engagement with docking station 502 and the fixed object (e.g. table 524 in FIG. 5).

Figure 6:
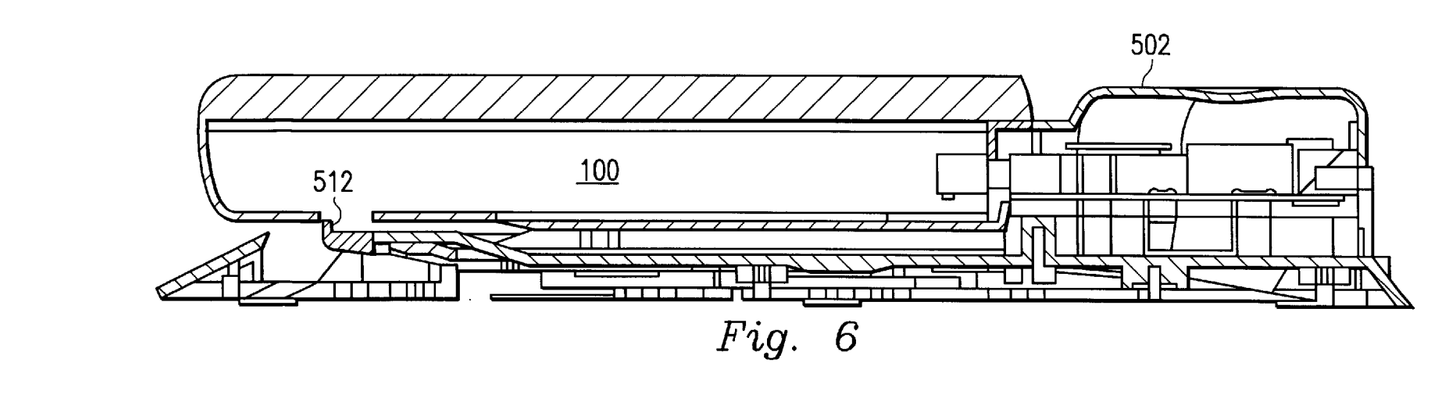
FIG. 6 is a first cross-sectional view of the docking station of FIG. 5 as it secures the portable embodiment of FIG. 3.

FIG. 6 is a first cross-sectional view of docking station 502 as it secures system 100. The view in FIG. 6 is from the perspective indicated by arrow A in FIG. 5. In the example of FIG. 6, the hook latch protrusions of security devices 510 and 512 are mechanically disengaged from system 100, in the same manner as discussed further hereinabove in connection with FIG. 5. For clarity, FIG. 6 shows the hook latch protrusion of security device 512, but not the hook latch protrusion of security device 510.

Figure 7:
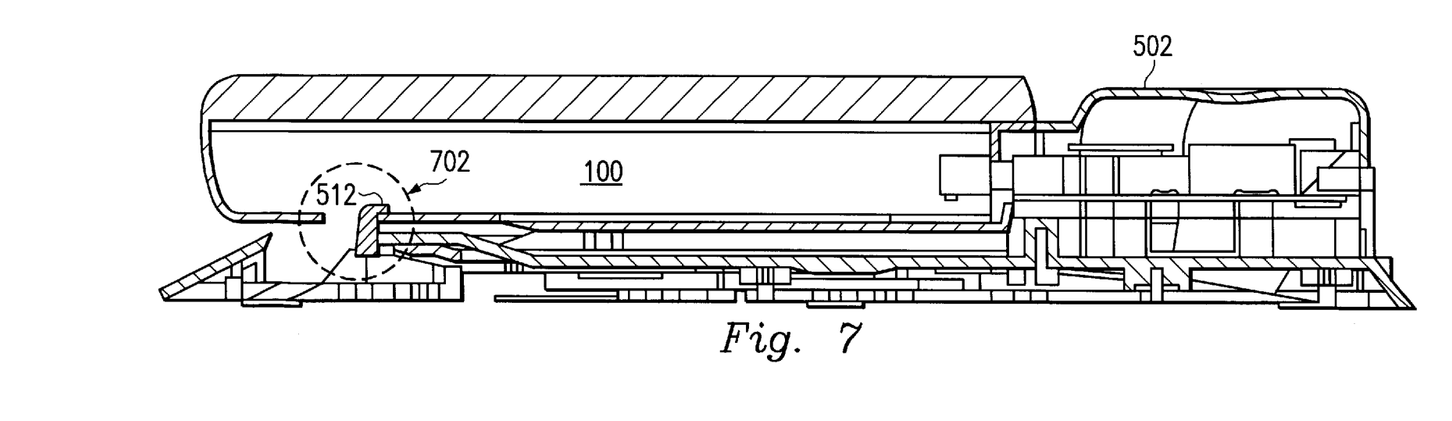
FIG. 7 is a second cross-sectional view of the docking station of FIG. 5 as it secures the portable embodiment of FIG. 3.

FIG. 7 is a second cross-sectional view of docking station 502 as it secures system 100. The view in FIG. 7 is from the perspective indicated by arrow A in FIG. 5. In the example of FIG. 7, the hook latch protrusions of security devices 510 and 512 mechanically engage with system 100, in the same manner as discussed further hereinabove in connection with FIG. 5. For clarity, FIG. 7 shows the hook latch protrusion of security device 512, but not the hook latch protrusion of security device 510.

Figure 8:
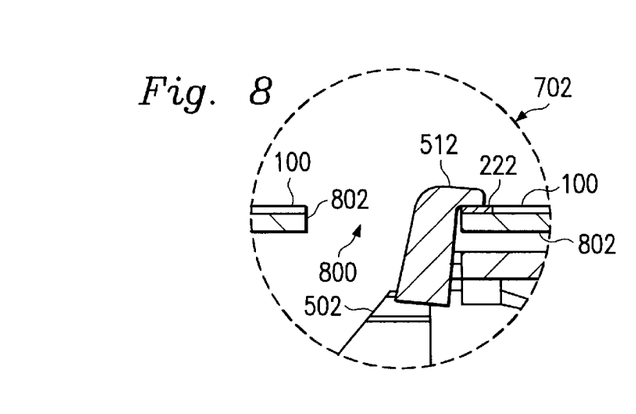
FIG. 8 is a magnified view of a portion of FIG. 7.

FIG. 8 is a magnified view of a portion, indicated by dashed enclosure 702, of FIG. 7. As shown in FIG. 8, the hook latch protrusion of security device 512 mechanically engages with system 100 through a bottom receptacle 800 of system 100. Referring simultaneously to FIG. 2, in a significant aspect of the illustrative embodiment, portion 222 of line 220 extends away from the PWA and is integral with a material 802 that houses components of system 100, either by being attached to material 802 or by being integrated within material 802, as shown in FIG. 8. In the illustrative embodiment, material 802 is formed primarily by plastic, and material that houses components of docking station 502 is formed primarily by metal.

As discussed hereinabove in connection with FIG. 5, when system 100 is to be mechanically secured to docking station 502, user 112 operates handle 506 by moving it to the lock position. In response to such an operation, the hook latch protrusions of security devices 510 and 512 move into mechanical engagement with system 100. During such engagement between docking station 502 and system 100, physical disconnection of system 100 from docking station 502 (e.g. physical removal of system 100 away from docking station 502) involves physically breaking system 100 by application of a predetermined physical force on system 100.

In another significant aspect of the illustrative embodiment, at the region of material 802 that is proximate to portion 222 of line 220, the plastic of material 802 is suitably formed in order to physically break in response to application of such predetermined physical force on material 802. Likewise, portion 222 of line 220 is suitably formed in order to physically break in response to application of such predetermined physical force on material 802. Such a force may, for example, be applied on material 802 during an attempted theft of system 100 away from docking station 502. In response to application of such force on material 802: (a) the plastic of material 802 physically breaks at the region that is proximate to portion 222 of line 220; and (b) portion 222 is physically disconnected (e.g. breaks away) from at least one other portion of line 220, thereby physically breaking line 220 to form an open circuit between power circuitry 216 and I/O controller circuitry 204 of FIG. 2.

Accordingly, in a significant aspect of the illustrative embodiment, receptacles 404 (FIG. 4) and 800 of system 100 are devices of system 100 for mechanically securing system 100 to a relatively fixed object (e.g. docking station 502 and/or table 524 of FIG. 5), so that physical disconnection of system 100 from the relatively fixed object involves physically breaking material 802 and portion 222 by application of the predetermined physical force on material 802.

Figure 9:
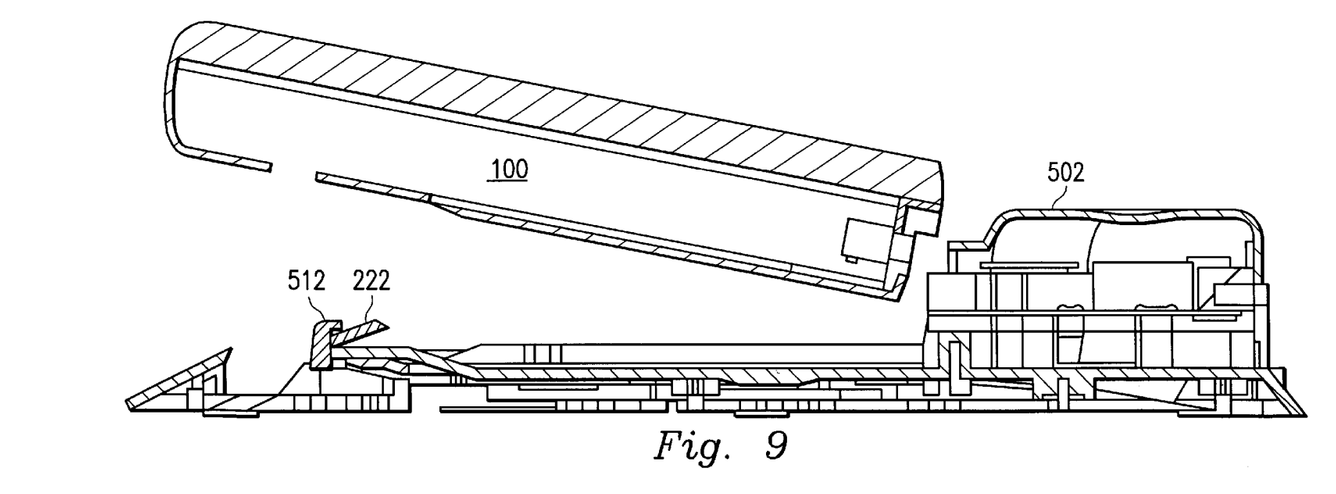
FIG. 9 is a third cross-sectional view of the docking station of FIG. 5 and the portable embodiment of FIG. 3.

FIG. 9 is a third cross-sectional view of docking station 502 and system 100 after such force has been applied on material 802. As mentioned hereinabove in connection with FIG. 2, the programming of BIOS 206 and the design of I/O controller circuitry 204 are suitable to disable booting and normal operation of computer 102 in such a situation when line 220 is broken to form an open circuit between power circuitry 216 and I/O controller circuitry 204. In that manner, in view of the fact that portion 222 of line 220 is integral with material 802, electronic circuitry components (e.g. BIOS 206 and I/O controller circuitry 204) of computer 102 detect a physical break in material 802 and, in response to the physical break, disable an operation of system 100.

Advantageously, in that manner, physical theft (away from docking station 502) of system 100 is discouraged, because BIOS 206 and I/O controller circuitry 204 disable booting and normal operation of computer 102 in response to such theft. Accordingly, security of system 100 is less dependent on increased strength of material 802 that houses components of system 100. As mentioned hereinabove, at the region of material 802 that is proximate to portion 222 of line 220, the plastic of material 802 is suitably formed in order to physically break in response to application of a predetermined physical force on material 802. Likewise, portion 222 of line 220 is suitably formed in order to physically break in response to application of such predetermined physical force on material 802. Such a technique of the illustrative embodiment is advantageous, because it supports formation of material 802 at a strength that is below practical limits (which are imposed by factors such as cost and weight).

Figure 10:
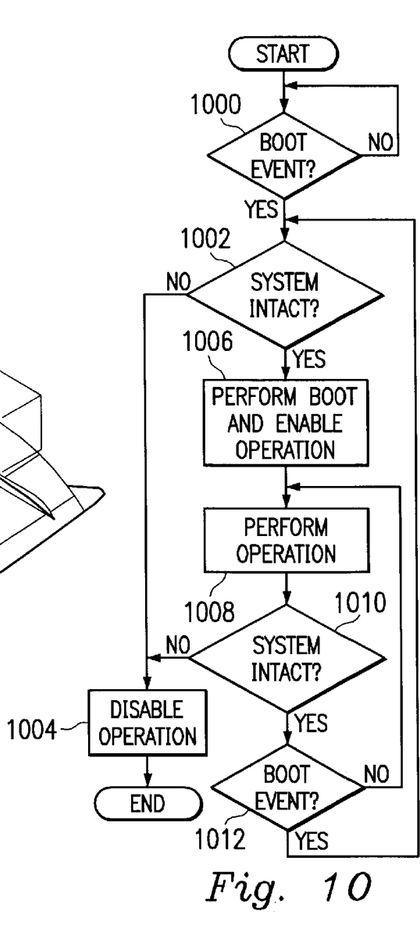
FIG. 10 is a flowchart of operation of the computer of FIG. 2 in securing the computer system of FIG. 1.

FIG. 10 is a flowchart of operation of computer 102 (FIG. 2) in securing system 100. The operation begins at a step 1000, where computer 102 determines whether to initiate execution of OS software (e.g. Microsoft Windows) in response to a boot event. Such a boot event may be, for example, user 112 "turning on" computer 102 (e.g. user 112 causing application of electrical power to computer 102 by switching an on/off button of computer 102). Alternatively, such a boot event may be receipt by computer 102 of a command to initially execute the OS software. For example, computer 102 may receive such a command from user 112 (e.g. through input devices 104), or from a computer application executed by computer 102, or from another computer (e.g. through network 114).

In response to a boot event, the operation continues to a step 1002 where computer 102 determines whether system 100 is intact. In determining whether system 100 is intact, system 100 determines whether line 220 is intact to form a closed circuit between power circuitry 216 and I/O controller circuitry 204. For example, if portion 222 is physically disconnected from another portion of line 220 (so that line 220 is physically broken to form an open circuit between power circuitry 216 and I/O controller circuitry 204 of FIG. 2), then line 220 is not intact.

At step 1002, if line 220 is not intact, then computer 102 disables booting and normal operation of computer 102 at a step 1004, and the operation ends. Conversely, if line 220 is intact, the operation continues to a step 1006. At step 1006, in response to the boot event (step 1000), computer 102 "boots" system 100 and enables normal operation of system 100.

Initiating operation of system 100 may be called "booting" (or "rebooting") system 100. Accordingly, in "booting" system 100 at step 1006, computer 102 copies portions of the OS software from a computer-readable medium (e.g. hard disk 111 or network 114) into memory 208, and computer 102 executes such portions. Moreover, in response to executing the OS software, computer 102 copies portions of application software from a computer-readable medium into memory 208, and computer 102 executes such portions at a step 1008.

Concurrently with step 1008, computer 102 determines (at a step 1010) whether system 100 is still intact (in the same manner as step 1002). Also, concurrently with steps 1008 and 1010, computer 102 determines (at a step 1012) whether to reboot system 100 (in the same manner as step 1000). Accordingly, in response to a boot event at step 1012, the operation returns to step 1002.

In a significant aspect of the illustrative embodiment, if computer 102 determines at step 1010 that system 100 has ceased being intact, then computer 102 disables booting and normal operation of computer 102 at step 1004, and the operation ends. Conversely, if computer 102 determines at step 1010 that system 100 is still intact, and if computer 102 determines the absence of a boot event at step 1012, then computer 102 continues execution of application software at step 1008.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system, comprising:
a housing for components of the computer system;
a portion of the housing including a material having circuitry for detecting a physical break in the material; and
an operation of the computer system being disabled in response to the physical break;
wherein the material is integral with an electrically conductive signal line.

2. The computer system of claim 1 wherein the electrically conductive signal line is attached to the material.

3. The computer system of claim 1 wherein the electrically conductive signal line integrated within the material.

4. The computer system of claim 1 wherein the material and the electrically conductive signal line are formed in order to physically break in response to application of at least one predetermined physical force on the material.

5. The computer system of claim 4 wherein the circuitry is for detecting a physical break in the material by detecting an open circuit that is formed by physically breaking the electrically conductive signal line.

6. The computer system of claim 5 wherein the circuitry is for detecting a physical break in the material by detecting an open circuit that is formed between power circuitry and input/output ("I/O") controller circuitry by physically breaking the electrically conductive signal line.

7. The computer system of claim 1 wherein the operation is a booting operation of the computer system.

8. The computer system of claim 1 wherein the operation is a normal operation of the computer system.

9. A computer system, comprising:
a housing for components of the computer system;
a portion of the housing including a material which is integral with an electrically conductive signal line, and wherein the material and the electrically conductive signal line are formed in order to physically break in response to application of a physical force on the material;
circuitry coupled to the signal line for detecting a physical break in the material by detecting an open circuit that is formed by physically breaking the electrically conductive signal line; and
in response to the open circuit, an operation of the computer system is disabled;
wherein the electrically conductive signal line is attached to the material.

10. A computer system, comprising:
a housing for components of the computer system;
a portion of the housing including a material which is integral with an electrically conductive signal line, and wherein the material and the electrically conductive signal line are formed in order to physically break in response to application of a physical force on the material;
circuitry coupled to the signal line for detecting a physical break in the material by detecting an open circuit that is formed by physically breaking the electrically conductive signal line; and
in response to the open circuit, an operation of the computer system is disabled;
wherein the electrically conductive signal line is integrated within the material.

11. A computer system, comprising:
a housing for components of the computer system;
a portion of the housing including a material which is integral with an electrically conductive signal line, and wherein the material and the electrically conductive signal line are formed in order to physically break in response to application of a physical force on the material;
circuitry coupled to the signal line for detecting a physical break in the material by detecting an open circuit that is formed by physically breaking the electrically conductive signal line; and in response to the open circuit, an operation of the computer system is disabled;

wherein the circuitry is for detecting a physical break in the material by detecting an open circuit that is formed between power circuitry and input/output ("I/O") controller circuitry by physically breaking the electrically conductive signal line.

12. The computer system of claim 9 wherein the operation is a booting operation of the computer system.

13. The computer system of claim 9 wherein the operation is a normal operation of the computer system.

14. The computer system of claim 9 wherein the circuitry includes input/output ("I/O") controller circuitry.

15. The computer system of claim 14 wherein the circuitry includes a basic input/output system ("BIOS").

16. The computer system of claim 9 wherein the material is formed primarily by plastic.

17. A computer system, comprising:

a housing for components of the computer system;

a portion of the housing including a material which is integral with an electrically conductive signal line, and wherein the material and the electrically conductive signal line are formed in order to physically break in response to application of a physical force on the material;

circuitry coupled to the signal line for detecting a physical break in the material by detecting an open circuit that is formed by physically breaking the electrically conductive signal line;

in response to the open circuit, an operation of the computer system is disabled; and wherein the computer system further includes a device for mechanically securing the computer system to a relatively fixed object, so that physical disconnection of the computer system from the relatively fixed object involves physically breaking the material and the electrically conductive signal line by application of the predetermined physical force on the material.

18. A computer system, comprising:

a housing for components of the computer system;

a portion of the housing including a material which is integral with an electrically conductive signal line, and wherein the material and the electrically conductive signal line are formed in order to physically break in response to application of a physical force on the material;

circuitry coupled to the signal line for detecting a physical break in the material by detecting an open circuit that is formed by physically breaking the electrically conductive signal line;

in response to the open circuit, an operation of the computer system is disabled; and wherein the computer system further includes a device for mechanically engaging the computer system with a docking station.

19. The computer system of claim 18 wherein the docking station includes a locking device for disabling mechanical release of the computer system from the docking station, so that physical disconnection of the computer system from the docking station involves physically breaking the material and the electrically conductive signal line by application of the predetermined physical force on the material.

20. The computer system of claim 19 wherein the docking station is connected to a relatively fixed object.

21. A method of disabling operation of a computer system, comprising:

housing components of the computer system;

providing a portion of the housing with a material including circuitry for detecting a physical break in the material; and in response to the physical break, disabling an operation of the computer system;

wherein housing also includes imbedding an electrically conductive signal line in the material.

22. A method of disabling operation of a computer system, comprising:

housing components of the computer system;

providing a portion of the housing with a material including circuitry for detecting a physical break in the material; and in response to the physical break, disabling an operation of the computer system;

wherein housing also includes attaching an electrically conductive signal to the material.

23. A method of disabling operation of a computer system, comprising:

housing components of the computer system;

providing a portion of the housing with a material including circuitry for detecting a physical break in the material; and in response to the physical break, disabling an operation of the computer system;

wherein housing also includes integrating an electrically conductive signal line within the material.

24. A method of disabling operation of a computer system, comprising:

housing components of the computer system;

providing a portion of the housing with a material including circuitry for detecting a physical break in the material; and in response to the physical break, disabling an operation of the computer system;

wherein housing also includes integrally forming an electrically conductive signal line to physically break in response to application of at least one predetermined physical force on the material.

25. The method of claim 24 wherein the step of detecting includes the step of forming an open circuit by physically breaking the electrically conductive signal line.

26. The method of claim 25 wherein the step of detecting includes the step of forming an open circuit between power circuitry and input/output ("I/O") controller circuitry by physically breaking the electrically conductive signal line.

27. The method of claim 21 wherein the step of disabling includes the step of disabling a booting operation of the computer system.

28. The method of claim 21 wherein the step of disabling includes the step of disabling a normal operation of the computer system.

* * * * *